Hollis C. Dunton
INVENTOR.

Dec. 14, 1954 H. C. DUNTON 2,696,852
STOCK FEEDER FOR CIRCULAR SAWS
Filed June 1, 1953 2 Sheets-Sheet 2
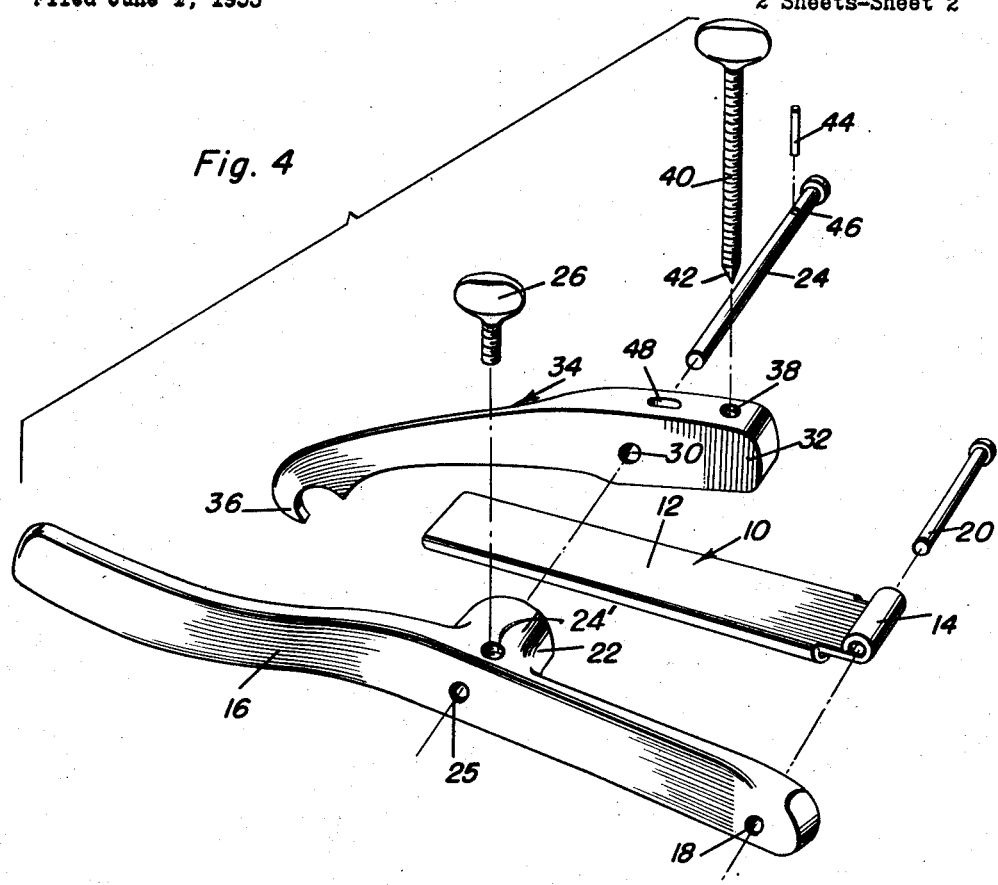
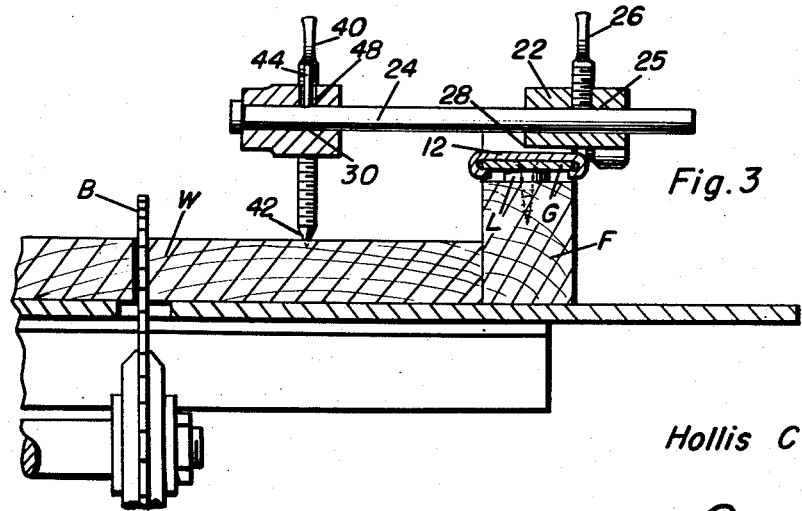
Hollis C. Dunton
INVENTOR.

United States Patent Office 2,696,852
Patented Dec. 14, 1954

2,696,852

STOCK FEEDER FOR CIRCULAR SAWS

Hollis C. Dunton, Smyrna, Ga.

Application June 1, 1953, Serial No. 358,664

7 Claims. (Cl. 143—51)

This invention relates to new and useful improvements in stock feeding devices for circular saws and the primary object of the present invention is to provide a device slidably engaged upon the saw fence of a circular saw and including means that will engage upper and rear faces of stock and a hand grip, whereby stock may be advanced in a safe and convenient manner.

Another important object of the present invention is to provide a stock feeder for circular saws including a stock gripping claw that is pivotally adjustably carried by a hand grip whereby the claw is capable of gripping work or stock of different thicknesses.

A further object of the present invention is to provide a stock feeder wherein the hand grip for advancing the stock will overlie the fence of a circular saw while the stock gripping claw will be offset from the fence to permit the feeder to be manually advanced without positioning a user's hand in the immediate area of the circular saw.

A still further aim of the present invention is to provide a stock feeder for circular saws that is simple and practical in construction, strong and reliable in use, small and compact in structure, efficient and reliable in use, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse vertical sectional view taken substantially on the plane of section line 3—3 of Figure 2; and, Figure 4 is a group perspective view of the present invention.

Figure 1:
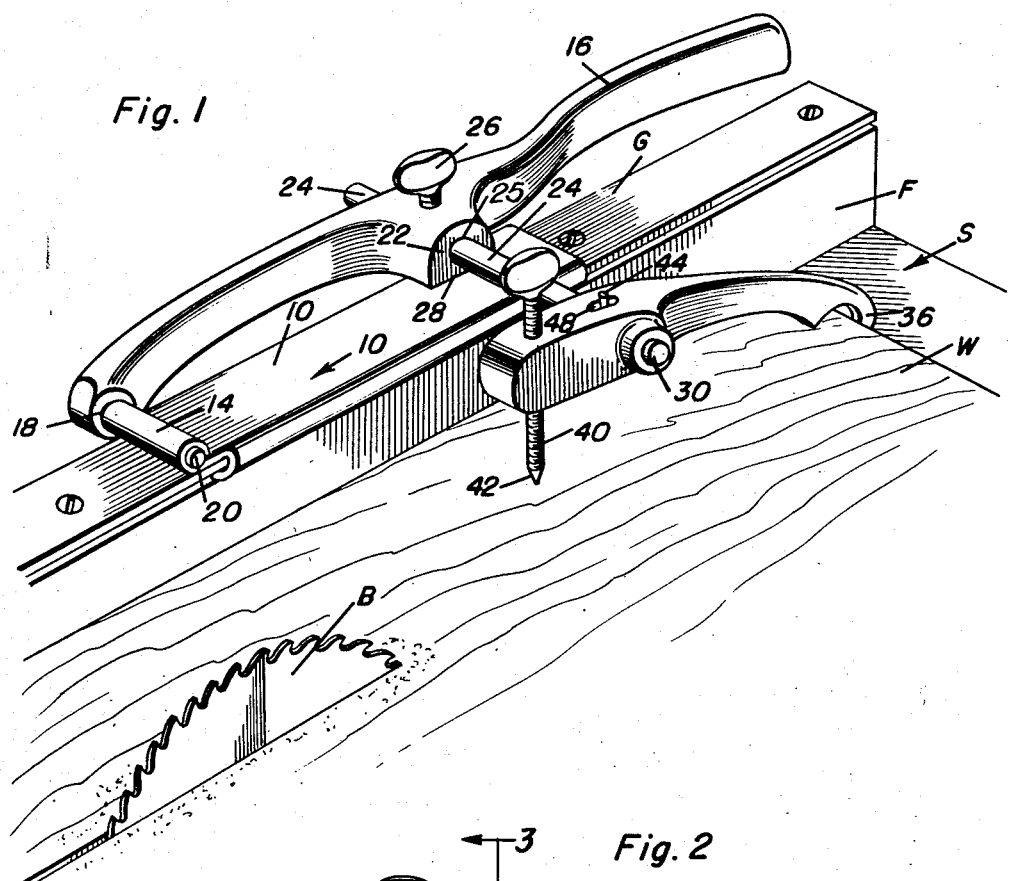
Figure 1 is a fragmentary perspective view of a circular saw including a fence, and showing the present invention engaged with the fence and also engaged with stock to advance the stock toward the blade of the saw.
Figure 2:
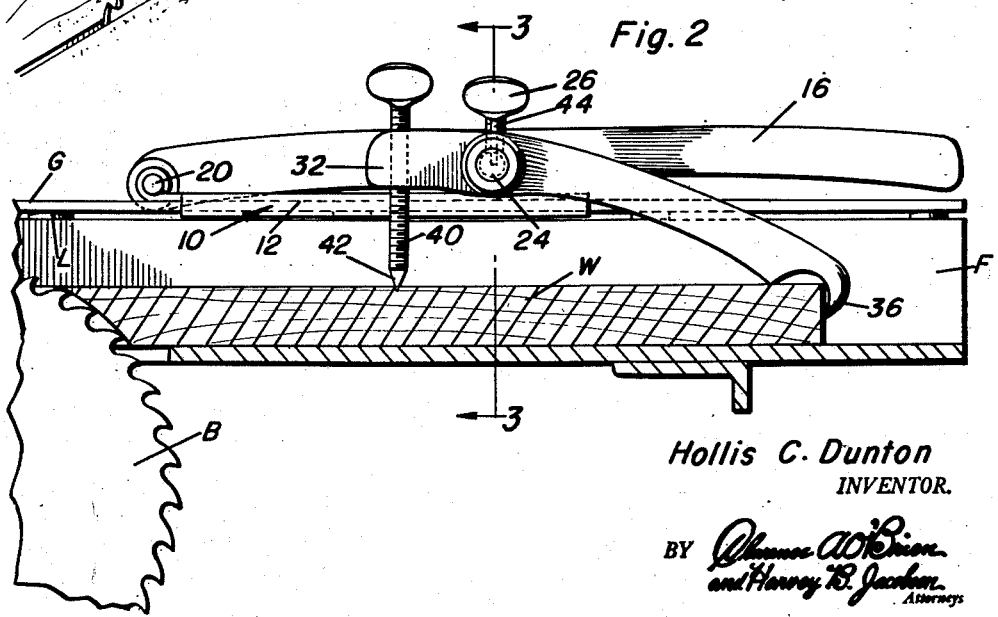
Figure 2 is a side elevational view of Figure 1 with the stock and part of the saw shown in section.

Referring now to the drawings in detail, wherein for the purpose of illustration, there is disclosed a preferred embodiment of the present invention, the numeral 10 represents a slide member comprising a downwardly facing channel-shaped strip 12 having its leading edge bent upwardly upon itself to form a transverse bearing sleeve 14.

A hand gripping element 16 is provided with a transverse aperture 18 at one end that accommodates one end of a headed pin 20. Pin 20 extends axially through bearing sleeve 14 and the head of pin 20 engages one end of sleeve 14 to limit sliding movement of the pin in the sleeve 14. The pin 20 is suitably retained in aperture 18, by being frictionally fitted therein or secured by a setscrew (not shown), to maintain the hand gripping element 16 offset from the slide member 10.

The central or intermediate portion of hand gripping element 16 is formed with an enlarged transverse bearing portion 22 that accommodates in a bore 25 therein one end of a support pin or rod 24. A threaded aperture 24' in portion 22 intersects the bore 25 receiving rod 24 and receivably engages a wing-head setscrew 26 that retains rod 24 in bearing portion 22. The underside of portion 22 is cut away to produce a flat wall 28 that may rest against the upper face of strip 12. Bore 25 extends the full length of the portion 22 so that rod 24 may be retained longitudinally adjusted therein by setscrew 26.

Rod 24 extends through a transverse aperture or enlarged bearing portion 30 in the shank portion 32 of a stock gripping claw 34. The trailing end of claw 34 is provided with a downwardly facing gripper finger 36 and the leading end of claw 34 is provided with a threaded, substantially vertical aperture 38 that receivably engages a wing-head adjusting screw 40 having a conical lower bearing end 42.

Aperture 30, which is disposed perpendicular to aperture 38, is located closer to the aperture 38 than to the finger 36 so that the screw 40 may be adjusted against the upper face of work or stock W to force finger 36 downwardly behind and in gripping position with the trailing edge of work W.

Means is provided for limiting rocking or pivotal movement of claw 34 upon rod 24. This means includes a limiter pin 44 having one end suitably retained within an upwardly facing radial recess 46 in rod 24. The upper face of shank portion 32 is provided with a slot 48 that intersects the aperture 30 and which accommodates pin 44.

In use of the invention, the fence F of a circular cutting saw S is provided with a rectangular guide strip G on its upper edge which is spaced above the fence F by spacers or lugs L so that the inturned flanges or guide strip 12 may slidably engage the side edges of strip G.

Rod 24 is adjusted within bore 25 by setscrew 26 to position the claw 34 with respect to the work or stock W which engages the fence F and so that the claw and screw 40 will clear the blade B of the circular saw. Then, the screw 40 is adjusted to engage the work and position the finger 36 against the trailing edge or face of the work. A user merely grips element 16 and slides the member 10 forwardly toward the blade B where the work is cut while the operator's hand is clear of the blade.

What is claimed as new is as follows:

1. A stock feeder for circular saws, said stock feeder comprising a slide member adapted to slidably engage a saw fence, a hand gripping element pivotally attached to said slide member for vertical swinging movement, a support rod secured to said hand gripping element and projecting laterally therefrom, a stock engaging claw pivotally carried by said rod alongside said hand gripping element, and means carried by said claw for engaging the upper face of stock to urge the claw into gripping engagement with one end of said stock engaged with said means.

2. A stock feeder for circular saws, said stock feeder comprising a slide member adapted to slidably engage a saw fence, a hand gripping element pivotally attached to said slide member for vertical swinging movement, a support rod secured to said hand gripping element and projecting laterally therefrom, a stock engaging claw having an intermediate transverse opening accommodating one end of said rod, means carried by said rod limiting movement of said claw on said rod, and means carried by one end of said claw for engaging work and urging the other end of the claw into a stock gripping position.

3. A stock feeder for circular saws, said stock feeder comprising a slide member adapted to slidably engage a saw fence, a hand gripping element pivotally attached to said slide member for vertical swinging movement, a support rod secured to said hand gripping element and projecting laterally therefrom, a stock engaging claw having an intermediate transverse opening accommodating one end of said rod, means carried by said rod limiting movement of said claw on said rod, and means carried by one end of said claw for engaging work and urging the other end of the claw into a stock gripping position, said limiting means including a limiter pin carried by and projecting laterally from said rod, said claw having a slot intersecting said opening and receiving said pin.

4. A stock feeder for circular saws, said stock feeder comprising a slide member adapted to slidably engage a saw fence, a hand gripping element pivotally attached to said slide member for vertical swinging movement, a supporting rod removably carried by said hand gripping element and projecting laterally therefrom, and a stock engaging claw having a transverse opening accommodating said rod and permitting pivotal movement of the claw on said rod, said claw having a gripping finger at one end, and an adjusting screw carried by the other end of said claw for bearing against the upper face of work underlying the claw to urge the finger into position for gripping the trailing end of said stock against which the screw is engaged.

5. The combination of claim 4 and means forming a connection between the claw and the rod and limiting pivotal movement of said claw on said rod.

6. The combination of claim 5 wherein said means comprises a limiter pin secured to and projecting perpendicularly from said rod and said claw having a slot intersecting the opening and accommodating said pin.

7. A stock feeder for circular saws, said stock feeder comprising a slide member adapted to slidably engage a saw fence, a hand gripping element pivotally attached to said slide member for vertical swinging movement, and a stock grip carried by said hand gripping element, said slide member including a channel-shaped strip having inturned side edges and a transverse bearing sleeve at one end of said strip, and a pin fixed to and projecting laterally from said hand gripping element and rotatable in said sleeve.

References Cited in the file of this patent

UNITED STATES PATENTS

| Number | Name | Date |
|---|---|---|
| 260,375 | Estabrook | July 4, 1882 |
| 594,985 | Dalbey | Dec. 7, 1897 |
| 707,641 | Rostochil | Aug. 26, 1902 |
| 2,410,467 | Valentine | Nov. 5, 1946 |
| 2,522,965 | Schaufelberger | Sept. 19, 1950 |

FOREIGN PATENTS

| Number | Country | Date |
|---|---|---|
| 185,254 | Great Britain | Sept. 7, 1922 |